May 5, 1964 G. COHEN 3,132,049
CAMERA ACCESSORY FOR COATING PRINTS
Filed June 15, 1961

INVENTOR.
GEORGE COHEN
BY Kenway, Jenney & Hildreth
ATTORNEYS 3,132,049
CAMERA ACCESSORY FOR COATING PRINTS
George Cohen, 84 Brandeis Road, Newton Center, Mass.
Filed June 15, 1961, Ser. No. 120,129
3 Claims. (Cl. 118—264)

This invention relates in general to photographic equipment. More particularly, it concerns an improved accessory for applying a protective coating to a print made with a camera of the type designed to develop a finished positive print quickly, within the camera itself.

The present application is a continuation-in-part of my now abandoned co-pending application Serial No. 59,450, filed September 29, 1960, and entitled "Camera Accessory."

In the operation of cameras of the above type, rolls of special films are employed. These rolls include both light-sensitive film on which a negative image is produced by exposure and development, and a chemically-sensitive paper. A number of developer filled pads are included in the roll and arranged in such a manner that after exposure the light-sensitive film and the paper are brought into face-to-face contact and the developer is released from one of the pads. The negative image of the film is thus transferred to the paper and a positive print is produced. The developing process is quite rapid and typically requires only a minute or so before the finished print is ready.

In order to prevent the print from fading and curling, each roll is sold in a package including a vial containing an applicator saturated in a liquid preservative. When the print has been developed and separated from the camera, the customary procedure is to open the vial, withdraw the applicator and spread the preservative liquid over the surface of the photograph.

The particular steps involved in treating a print in this fashion are somewhat awkward in that care must be taken lest the preservative soil the operator's hands and whatever surface is used to hold the print flat during the coating operation. Also, care must be taken that the preservative is uniformly distributed over the emulsion surface to insure a neat even finish. The vial must be stored and carried as a separate item apart from the camera and therefore may easily be misplaced or broken.

It has been previously proposed to provide a camera accessory having a preservative-soaked pad mounted in a housing formed with a transverse slot for the passage of a photographic print over the pad, by means of which a coating of preservative may be conveniently applied to the print. However, the preservative solution has a strong tendency to evaporate, so that frequent replenishments of preservative are required. Furthermore, the preservative tends to leak from the accessory through the slot, and may stain the clothing if carried in the user's pocket, or leak into a camera if mounted thereon.

It is the primary object of the present invention to avoid these inconveniences by providing an improved camera accessory for applying a preservative finish to photographic prints, having means for preventing leakage or evaporation of a preservative solution from a pad contained therein.

Briefly stated, according to a preferred embodiment of the invention, a camera accessory is provided which includes a compact housing, which may be carried separately. An insert assembly comprising a preservative-soaked pad overlies a wiping surface formed in the housing, the pad and wiping surface being aligned lengthwise with a slot formed transversely through the walls of the housing. The opening is arranged for passage of a photographic print therethrough, for a wiping application of preservative by the pad to the print. According to a principal feature of the invention, a cover is mounted on the housing for movement to a first position closely overlying and hermetically sealing the transverse slot of the housing, and to a second position exposing the opening for receiving photographic prints. The cover serves to prevent leakage or evaporation of the preservative when the accessory is not in use. The pad may directly engage the print, the slot being formed with a planar surface opposed to the pad surface for pressing the print into engagement therewith.

Preferably the housing is cylindrical in form. A cylindrical tubular cover is rotatably received on the housing in snugly-fitting relation, and is formed with diametrically opposed longitudinal openings registering with the print-receiving slot of the housing in one rotational position on the housing. A preservative pad is received in a groove extending longitudinally through the housing, for convenient removal to replenish the supply of preservative contained in the pad. End caps are removably received upon the ends of the housing to retain the assembly for normal use.

Further objects and advantages of the invention will appear from the following detailed description of a preferred embodiment thereof, with reference to the accompanying drawings, in which.

Figure 1:
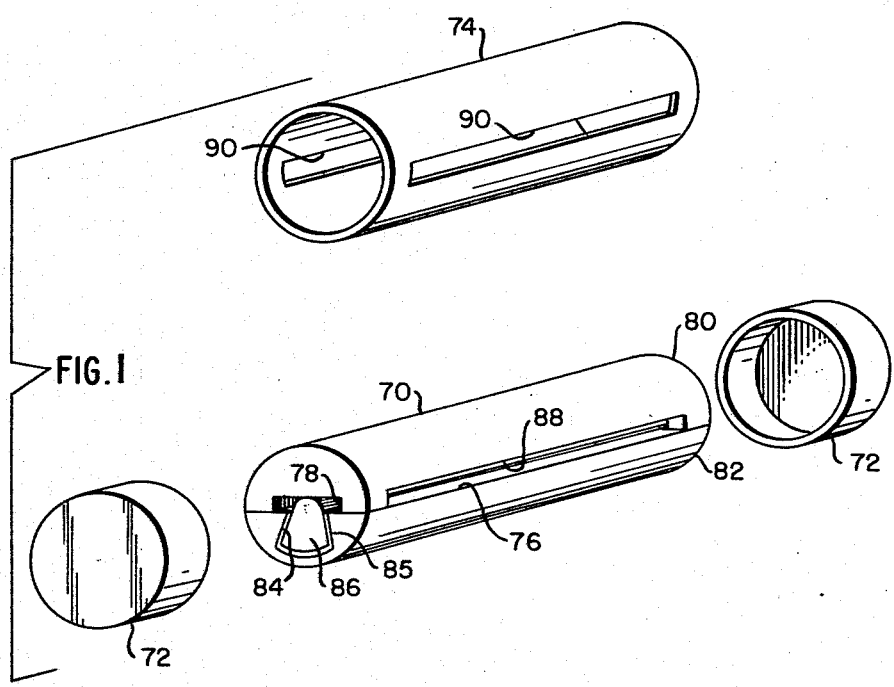
FIG. 1 is an exploded perspective view of an embodiment of the invention.
Figure 2:
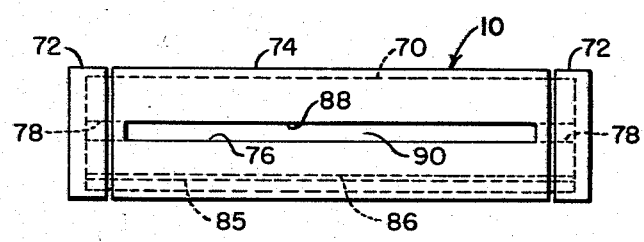
FIG. 2 is a view in elevation of the assembled accessory of FIG. 1.

Referring to FIGS. 1 and 2, the reference character 10 generally indicates a print-finishing accessory for use with cameras, and having particular utility for use with the well-known Polaroid-Land type of camera. The accessory is organized about an elongated cylindrical housing generally designated 70, a pair of end caps 72, and a cylindrical tubular cover 74. These elements may be made of any desired material which is not affected chemically by a desired preservative solution, such as a suitable plastic. The housing is formed with a longitudinally extending print-receiving slot 76 passing transversely therethrough, of a size to receive a photographic print. The slot does not extend the full width of the housing over its entire length, but is extended the full length across a central portion of the ends of the housing to form recesses 78, as shown. The housing may be conveniently formed of semi-circular segments 80 and 82, which are subsequently secured in a permanent manner by plastic cement, or by other suitable means. However, the holder may be molded as a unitary body if desired. An undercut groove 84 is formed in the lower portion 82 of the housing, extending the entire length thereof to receive a clip 85 carrying an absorbent pad 86, in longitudinally slidable relation. The pad and its clip conforms to the cross section of the groove 84, and the pad extends across the slot 76 into engagement with a planar surface 88 of the slot, formed in the upper portion 80 of the housing.

The cylindrical tubular cover 74 is slidably received snugly upon the housing in relatively rotatable relationship. The cover is formed with longitudinally-extending openings 90 diametrically opposed therein for registration with the slot 76 in a first rotational position of the cover, as shown in FIG. 2. The cylindrical end caps 72 are received upon the ends of the housing with a sufficiently tight fit to be held in place securely, and yet be readily removable by a user.

In use, the pad 86 may be slid longitudinally from the groove 84 and saturated with a suitable preservative solution. The pad is then reinserted in the groove, and the cover 74 and end caps 72 are reassembled on the housing. When it is desired to coat a photographic print with preservative, the cover is rotated to the first position, shown in FIG. 2, registering the openings 90 with the slot 76, and the print is passed through the slot for wiping engagement with the pad 86, being guided by the planar surface 88 and pressed into engagement with the pad thereby. Following use, the housing is rotated to a second position in which its walls closely overlie and hermetically seal the slot 76. The cover is thus effective to prevent evaporation or leakage of the preservative solution from the housing, and the accessory may be conveniently carried in the pocket of the user, or mounted upon a camera, without fear of evaporation or damage through leakage of the preservative.

It will be appreciated that the improved camera acessory applies a smooth uniform coating of preservative to a photograph passed therethrough. Because of its sealable construction, the accessory may be carried in a pocket or gadget bag, or attached to a camera, without fear of leakage or evaporation of the preservative solution.

A number of different materials may be employed in the manufacture of this accessory. For instance, plastic, aluminum or stainless steel would serve admirably for the housing, cover and support member while the wick may be made from a suitable absorbent material such as a felt pad, a plastic sponge or the like Many other modifications will appear to those skilled in the art without departing from the invention. Having thus described my invention, what I claim and desire to secure by Letters Patent of the United States is:

1. A camera accessory, comprising a tubular cylindrical housing, a pad disposed in said housing, said housing being formed with a slot extending longitudinally thereof and transversely therethrough to permit the passage of a photographic print, said pad being adapted to hold a quantity of photographic preservative and arranged to apply a coating of the preservative to a photographic print passed through said slot, and a cover comprising a cylindrical tube receiving said housing in snugly fitting rotatable relation for movement to a first position closely overlying said slot to hermetically seal said pad within said housing, said cover being formed with longitudinal openings and being movable to a second position in which said openings register with said slot for passage of photographic prints therethrough.

2. A camera accessory, comprising a cylindrical housing, said housing being formed with a longitudinal slot extending transversely therethrough to permit the passage of a photographic print, a pad disposed within said housing and extending longitudinally of said slot, said pad being adapted to hold a quantity of photographic preservative and arranged to apply a coating of the preservative to a photographic print passed through said slot, a cylindrical tubular cover rotatably received on said housing for movement to positions closely overlying said slot to hermetically seal said pad within said housing, said cover being formed with diametrically opposed longitudinally-extending openings arranged for registration with said slot in a further rotational position of said cover on said housing to expose said slot for passage of photographic prints therethrough, said housing having means for securing said cover longitudinally thereon.

3. A camera accessory as recited in claim 2, in which said means for securing said cover on said housing comprises a pair of cylindrical caps detachably received on the opposite ends of said housing, said housing being formed with a groove extending longitudinally therethrough and opening into said slot, said pad being slidably received in said slot for longitudinal removal from said housing upon removal of said caps from said housing, to accommodate replenishment of a supply of preservative solution in said pad.

References Cited in the file of this patent
UNITED STATES PATENTS

| | | |
|---|---|---|
| 1,758,326 | Langsner | May 13, 1930 |
| 2,740,374 | Booth et al. | Apr. 3, 1956 |
| 2,873,660 | Land et al. | Feb. 17, 1959 |
| 2,908,025 | Ashby et al. | Oct. 13, 1959 |
| 2,950,664 | Stolier | Aug. 30, 1960 |
| 2,995,994 | Jackson | Aug. 15, 1961 |